F. E. VALOIS.
STOP MOTION.
APPLICATION FILED OCT. 31, 1917.

1,422,640.

Patented July 11, 1922.
3 SHEETS—SHEET 2.

INVENTOR:
Felix Emile Valois
by MacLeod, Calver, Copeland & Dike
Attys.

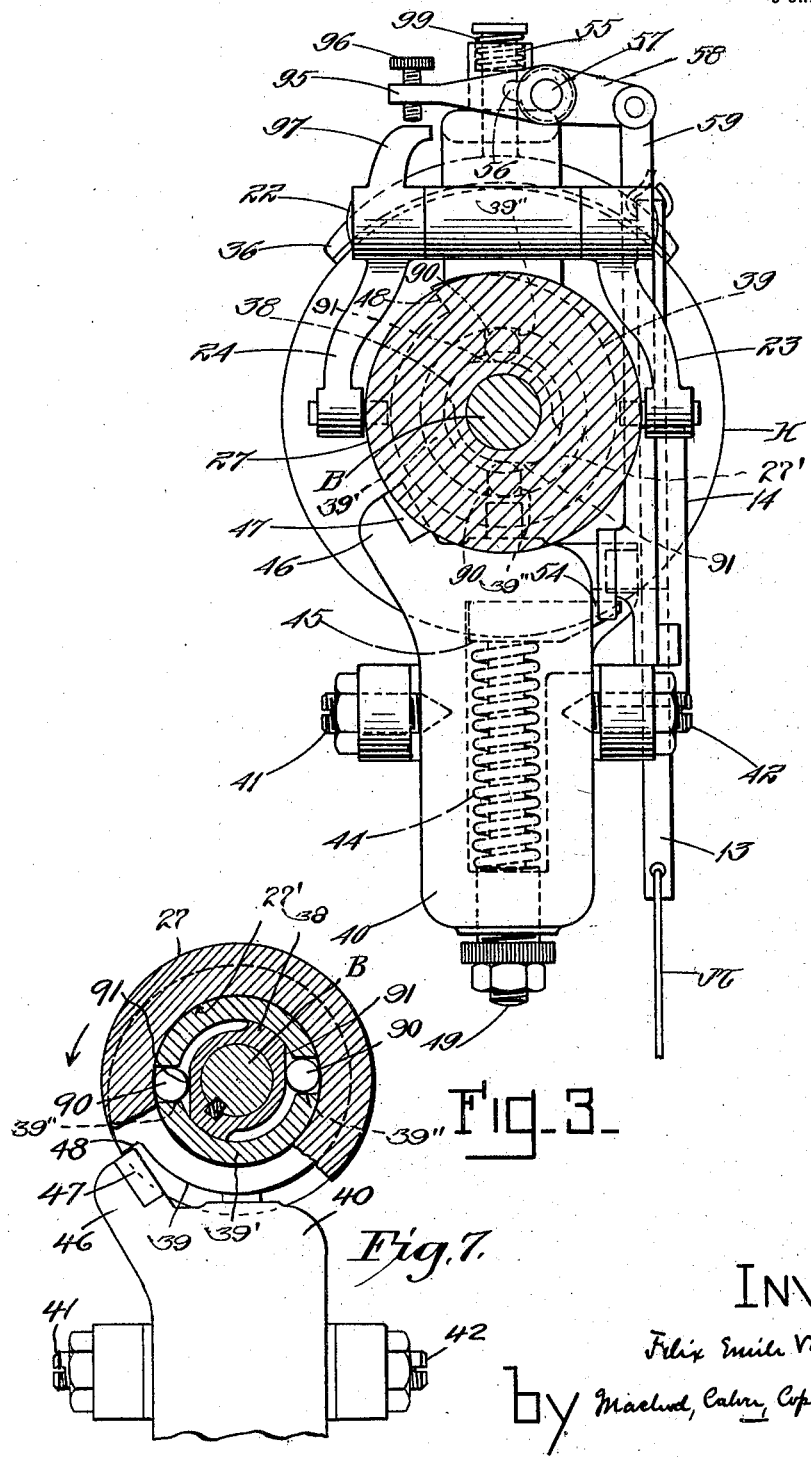

UNITED STATES PATENT OFFICE.

FELIX EMILE VALOIS, OF HAVERHILL, MASSACHUSETTS, ASSIGNOR TO HAMEL SHOE MACHINERY COMPANY, OF LYNN, MASSACHUSETTS, A CORPORATION OF MASSACHUSETTS.

STOP MOTION.

1,422,640.        Specification of Letters Patent.        Patented July 11, 1922.

Original application filed July 31, 1916, Serial No. 112,230. Divided and this application filed October 31, 1917. Serial No. 199,402.

*To all whom it may concern:*

Be it known that I, FELIX EMILE VALOIS, a citizen of the United States, residing at Haverhill, county of Essex, State of Massachusetts, have invented a certain new and useful Improvement in Stop Motions, of which the following is a specification, reference being had therein to the accompanying drawings.

This application is a division of my prior application for improvement in stop motions filed July 31, 1916, Ser. No. 112,230.

The invention relates to stop motions for use on various kinds of rotary machines, such as shoe sewing machines, button hole machines, folding machines, and shoe machines to relieve the operator of the work of stopping the machine by hand at the proper position in the cycle of motion. Machines of this general character, as heretofore constructed, have been provided with a hand wheel by which the operator stops the machine and by which he turns the machine backward or forward to permit the work to be inserted or removed at a predetermined point in the cycle of operation of the machine. This makes it necessary for the operator to use one hand to stop and turn back the machine, and consequently delays him in his work.

My present invention provides an automatic mechanism by means of which the machine will be stopped when the foot treadle by which the operator controls the machine is released. The machine will be stopped quickly even when running at low speed, and will come to rest with the stitch working instrumentalities in proper position ready for the insertion or removal of the work.

The general operation of the stop motion embodying my invention differs fundamentally from devices of a similar character which have heretofore been employed. Heretofore, the stop motion has acted first to slow down the machine from the high speed at which it normally runs, thereafter bringing the machine to rest at the predetermined point while the machine is being driven at low speed. The result has been that an unnecessarily large proportion of the time has been consumed in stopping and turning back the machine to the predetermined point in its cycle. This has sometimes been accomplished by having high speed driving mechanism and low speed driving mechanism and arranging the stop motion so that it acts to change the drive from high speed to low speed and then stops the machine.

In the device embodying my invention, the stop motion first operates to connect the machine so that it will be operated momentarily at least by the high speed driving mechanism, and then disconnects the driving mechanism and stops the machine. If, for instance, the operator wants to stop the machine while running slowly along some portion of the work, the stop motion first puts the machine into high speed, and then stops it, in the predetermined position in the cycle of operation. The result is that the output of the machine is very much increased. I find that the mechanism embodying my invention will stop a machine with no noise or jar even though it is driven by the high speed drive at full speed.

The machine is so constructed that a single belt is employed even though the machine can be run at a range of speeds. The stop motion may be disconnected by moving a single lever, and thereafter the machine can be operated by the hand wheel as in the past. The stop motion is also so constructed that it will stop the machine by letting up the treadle enough to disconnect the driving clutch but not enough to set the stop motion in action, the machine under these conditions, stopping by the loss of momentum with the working instrumentalities still in operation. This is convenient, as it gives the operator a chance to examine the work whenever he desires. It permits the use of the machine on a large range of work, as for instance welt shoes where the welt is sewed all the way around the upper. In this case the operator will let up the treadle just enough to disconnect the drive, he will then cut off the welt, depress the drive and continue the stitching until he reaches the starting point when he will release the treadle and the stop motion will stop the machine.

In the following description I have described the stop motion embodying my invention as applied to a shoe sewing machine, as I have already put my invention into commercial use in connection with this machine. It will be understood however that my stop motion is applicable to a considerable variety of machines for other purposes and that I do not limit myself to the embodiment as shown in the drawings. It will further be understood that I desire to claim my invention in the broadest possible manner, since I believe myself to be the first to construct a stop motion which acts to speed up the machine before it stops it.

The invention will be fully understood from the following specification taken in connection with the accompanying drawings, and the novel features thereof will be pointed out and clearly defined in the claims at the close of this specification.

In the drawings, Fig. 1 is a front elevation of mechanism embodying my invention, certain parts being in section, and only so much of the sewing machine being shown as is necessary for an understanding of the present invention.

Fig. 3 is a section on line 3—3 of Fig. 1, looking in the direction of the arrows.

Fig. 6 is a detail of the stop cam and the upper end of the stop lever, the parts being in the position occupied while the machine is being stopped.

Fig. 7 is a sectional view on the line 7—7, Fig. 1, the rolls and roll carrier being in stopping position.

Figure 1:
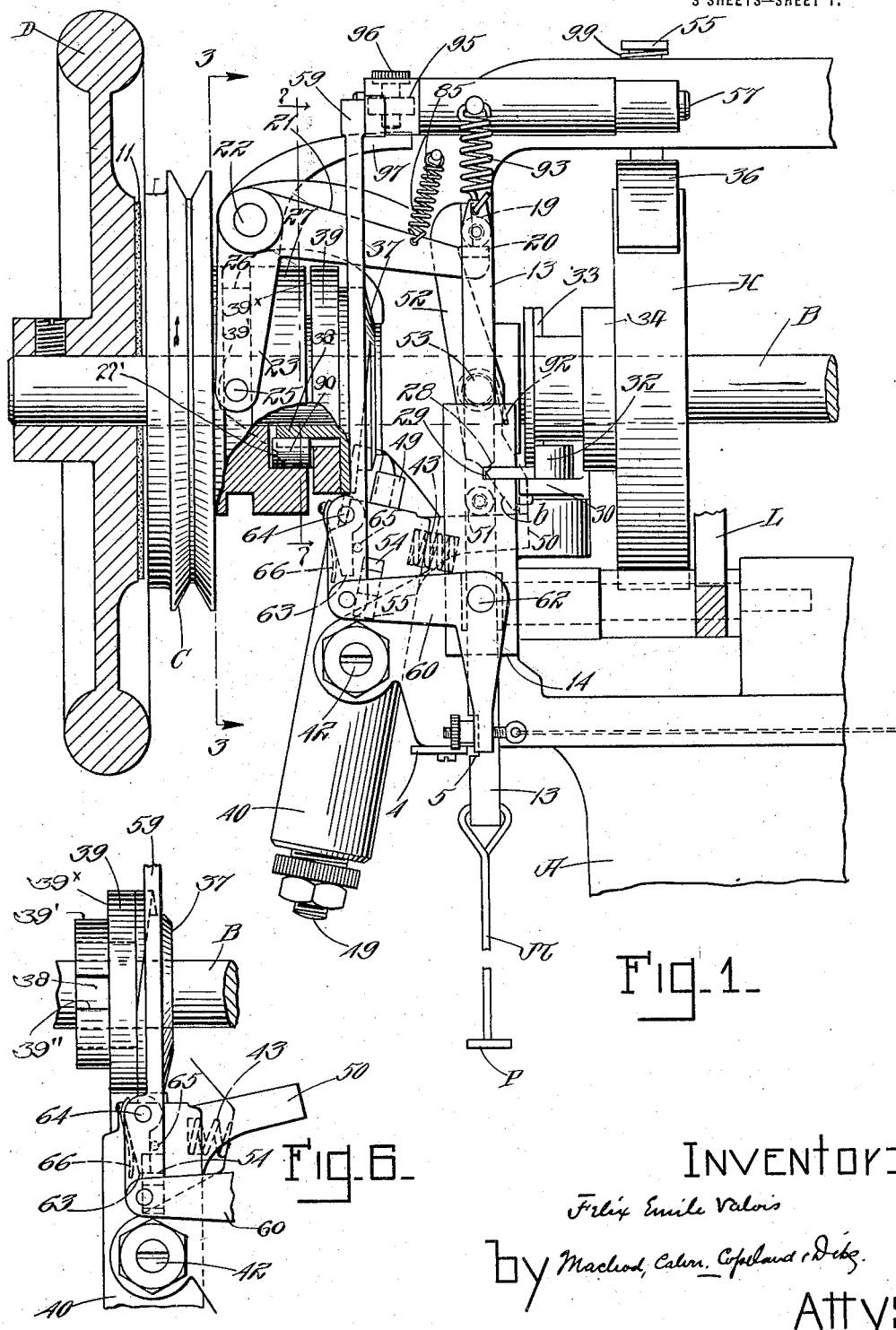

Referring to the drawings, there is shown at A the frame of the machine, at B the main driving shaft, at C the driving pulley, and at D the hand wheel, said hand wheel being fast to the main shaft B. Interposed between the driving wheel C and the hand wheel D is a leather disk 11 fastened to the face of the hand wheel or of the driving wheel. It will therefore be understood that when the driving wheel C is moved to the left, the hand wheel D and main shaft B will be caused to rotate by frictional contact. At L is shown part of a bell crank by which one of the working instrumentalities of the machine, in this case the needle (not shown) is operated. At P is shown the treadle by means of which the machine is controlled by the operator. The treadle P is connected by a chain or wire M to the lower end of a treadle bar 13 movable vertically in a guideway formed by a groove in the frame of the machine and a cover 14 secured thereto.

The upper end of the treadle bar 13 is provided with a roll 19 which rests on a hard wearing surface 20 formed on the end of an arm 21 of a rock shaft 22. This rock shaft has two arms 23 and 24 carrying rolls 25 which form a clutch shifter and which are located in a groove 26 of the clutch hub 27 of the driving wheel C. When the treadle P is depressed, this mechanism pushes the hub 27 to the left, as viewed in Fig. 1, and produces a frictional engagement sufficient to drive the wheel D and thus the machine. For convenience these parts may be referred to as the "variable speed clutch". The pressure exerted on the treadle P by the operator will regulate the speed of the machine. The greater the pressure the faster the machine will run until it is revolving at the same speed as the main driving wheel C. The treadle bar 13 is held up by a spring 93 which is strong enough to lift the bar and attached parts. As will be explained more fully later, the treadle bar actuates the stop motion, but the treadle bar has a range of motion sufficient to vary the speed of the machine from full speed down to a point where the clutch is disengaged and the machine can stop by loss of momentum, the purpose being to make it possible for the workman to run the machine at any speed or even to stop it by hand in the old way without the interposition of the stop motion.

The treadle bar 13 is provided on its side edge with a notch 28 within which is received the end of a finger 29 formed on a lever 30 pivoted at 31 to the frame of the machine. The finger 29 is guided in a slot formed in the cover 14 in which the treadle bar slides. The lever 30 carries a small roller 32 moved by the cam-face 33 formed by a slot in a cam 34 fixed on the main shaft B. A spring 94 holds the roller 32 in contact with the cam face 33. This cam roll operates to move the lever 30 and withdraw the finger 29 from the notch in the treadle bar so that the treadle bar can be moved above a predetermined point only when the main shaft is in a certain position. The upper edge of the notch 28 in the treadle bar is rounded or inclined so that the treadle bar can be pulled down by the treadle even when the finger 29 is in the slot, but whenever the finger is in the notch it will prevent the treadle bar being raised above the predetermined point. It will be seen that the cam 34 is not a positive cam and that when the notch 28 is not opposite the end of the finger 29, the said finger will rest against the side of the treadle bar 13, except when it is moved away by the high spot $h$ on the cam face 33.

On the main shaft B is fixed the disk H by which some of the working instrumentalities are operated. The periphery of this disk serves as a brake wheel and is engaged by a brake 36 which is operated by the stop motion in a manner which will be described hereafter. There is also keyed on the main shaft B, a stop cam 37 having a hub 38 which acts as one member of a roll clutch of the well known Horton type represented in the United States Patent No. 260,394, of July 4, 1882. The driving member of this clutch is constituted by the hub 27 of the driving wheel C; such hub being recessed to provide the internal cylindrical driving surface 27'. Between the driving surface 27' and the clutch hub 38 is positioned the reduced hub extension 39' of the roll-carrier 39, the hub 39' being formed with the diametrically opposed slots 39'' for reception of the clutch rolls 90. For convenience this clutch may be referred to as the full speed clutch. When the clutch hub 27 on which the drive wheel C is mounted is moved to the right as shown in Fig. 1, it first engages the face 39$^x$ of the roll carrier 39 of the full speed clutch frictionally and speeds up the latter, thus carrying the clutch rolls 90 ahead and wedging them between the driving surface 27' and the inclined or eccentric portions 91 of the clutch hub 38, as shown in Fig. 3. This action effects the clutching of the shaft B to the drive wheel C, whereby the shaft B is driven at the speed of such drive wheel until the parts are de-clutched. The roll carrier 39 is provided on its exterior with a tooth 48 which assists in effecting the de-clutching of the driving member 27 and the hub 38 of the stop cam 37.

The stopping of the machine is effected by the following mechanism: At 40 is shown a swinging stop lever pivoted on trunnions 41, 42 to the frame of the machine. A spring 43 exerts a pressure on the upper end of the stop lever 40 and pushes it toward the cam 37 previously referred to. The stop lever 40 is hollow and contains a spring 44 which surrounds a pin 49 which also serves as a cam follower and carries a collar 45 against which the upper end of the spring 44 rests. The collar 45 is provided with an arm 54 which extends sideways through a slot 55 in the side of the stop lever 40. The upper end of the spring pin or cam follower 49 protrudes through the upper end of the stop lever. The stop lever 40 also has an arm or projection 46 protected by a hardened steel face 47. This arm or projection 46 is located so that it may be swung into the path of the tooth 48 on the roll carrier 39 of the full speed clutch. The stop lever 40 also has a tail 50 extending across the treadle bar 13 at a point underneath a small roller 51 so that when the treadle bar is depressed the upper end of the stop lever will be swung to the right as shown in Fig. 1 and the spring 43 will be compressed to set the parts. The stop lever is held normally in this position by means of a latch 52 pivoted at 53 to the frame of the machine. The latch 52 is extended upwardly above its pivot 53 and has a hooked tail overhanging the hardened wear plate 20 carried above the end of arm 21. This tail, when in operative position, serves to prevent upward movement of said arm 21 under the action of the spring 85, but upon the movement of the upper end of latch 52 to the left at a pre-determined point in the stopping cycle of the machine, arm 21 is free to rise. This mechanism actuates the clutch mechanism which will be described in detail hereafter. A spring 92 surrounds the pivot 53 and holds the lower end of the latch 52 to the left as seen in Fig. 1.

The lower end of the latch 52 is normally in the path of movement of the tail 50 of the stop lever and, therefore, holds the spring 43 compressed and the upper end of the stop lever to the right as shown in Fig. 1 until the latch is moved to release the parts.

Figures 4, 5:
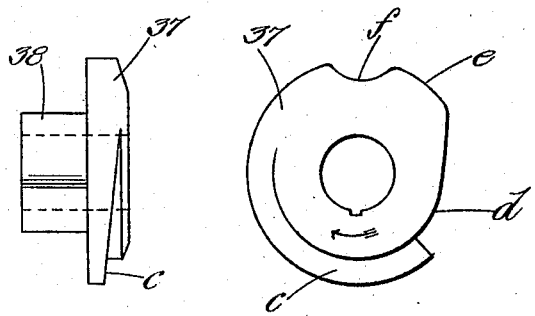
Fig. 4 is a side elevation of the cam 37.
Fig. 5 is an end view of the cam shown in Fig. 4.

When the treadle is released and the treadle bar 13 is pulled up by the spring 93, the roller 51 strikes a cam surface $b$ on the latch 52 and pushes it aside so that the spring 43 is then free to act and push the stop lever 40 toward the cam 37. The upper end of the spring pin or cam follower 49 is out of the path of the cam 37 when the parts are in the position shown in Fig. 1. When the stop lever is released and is pushed over by the spring 43, the upper end of the spring pin or cam follower 49 comes into the path of the cam. The shape of this cam will be clearly seen from Figs. 4 and 5. There is an inclined surface $c$ on the end face which runs into a cut away portion $d$ on the edge of the cam and this is followed by a high spot $e$ also on the edge of the cam. A short distance beyond this high spot is a deep notch $f$. The result of this construction is that when the stop lever 40 is pushed over by the spring 43 the side of the pin 49 rests against the side of the cam 37 so that when the cam 37 revolves the pin 49 follows down the incline $c$ moving still further to the left until the end of the pin rests on the edge surface $d$ of the cam. The further movement of the cam pushes down the spring pin 49 and compresses the spring 44, the full limit of movement of the pin being reached when it is on the high spot $e$. Sufficient energy is thus stored in the spring by the cam to actuate the brake, when the spring is released. The further movement of the cam allows the end of the pin to snap up into the notch $f$ being operated by the spring 44.

This has the effect of applying the brake 36 to the periphery of the disk H which serves as a brake wheel. The mechanism just described forms a convenient brake mechanism by which to bring the main-shaft suddenly to a standstill without destructive shock; but it will be understood that the invention is not limited to such mechanism and that the terms "brake" and "brake mechanism" as used in the claims are not limited to friction stops such as shown in the drawings but are intended broadly to cover any other equivalent mechanism for bringing the main-shaft to a standstill.

The upper end of the slide rod 55 which carries the brake 36 is provided with a notch in which operates a tooth 56 formed on a rock shaft 57 (see Fig. 3). This rock shaft 57 has an arm 58 to which is connected the upper end of a link 59. The link 59 is connected at its lower end to a bell crank 60 pivoted at 62 to the cover 14 which is secured to the frame of the machine. As shown in the drawings the bell crank 60 operates a tension release which being of well known construction, will not be described in detail herein. This bell crank may be used to operate some other portion of the machine if desired. The link 59 has near its lower end a pawl 63 pivoted to it at 64. At 65 is shown a stop against which the pawl is normally held by means of a spring 66. The lower end of the pawl 63 is in the path of the arm 54 when the stop lever is being swung over by the spring 43. When the pin 49 has been fully depressed by the action of the cam 37 being at that time on the high spot e of the cam, the arm 54 will be under the pawl 68. As soon as the end of the pin 49 rides over the high spot e into the notch f, the heavy spring 44 will push up the pawl 63 and the link 59 on which it is mounted and will actuate the brake 36 through the rock shaft 57.

The upward movement of the spring pin 49 and link 59 also performs other functions. The lever 58 is extended beyond its pivot 57 and is provided with an arm 95 which carries an adjusting screw 96 which is located over an arm 97 forming a part of the rock shaft 22. The adjusting screw is set so that when the link 59 is moved up by the pin 49 in the stop lever 40, it will contact with the arm 97 and move the rock shaft 22 to slide the hub 27 to the left out of frictional contact with the face of the roll carrier 39, but not enough to cause it to contact with the hand wheel. This prevents the hub 27 rubbing against the roll carrier and causing undue friction while the machine is idle.

To enable the operator to use the machine without the stop motion, there is provided a small lever 4 which I term the stop-motion cut out which engages a notch 5 in the treadle bar 13. This notch is long enough to allow the treadle bar to be moved enough to operate the variable speed clutch C but when the stop motion cut out is in the notch the spring 93 cannot lift the treadle bar high enough to operate the stop motion.

The operation of the machine embodying my invention is as follows: It will be assumed that the machine is in use to sew a shoe, the treadle P being depressed so that the driving wheel C is in frictional contact with the hand wheel D. It may also be assumed that the pressure on the treadle is light so that there is considerable slip between the drive wheel C and the hand wheel D and the machine, therefore, is running very slowly and has practically no momentum. If the operator desires to stop the machine, he releases the treadle.

Figure 2:
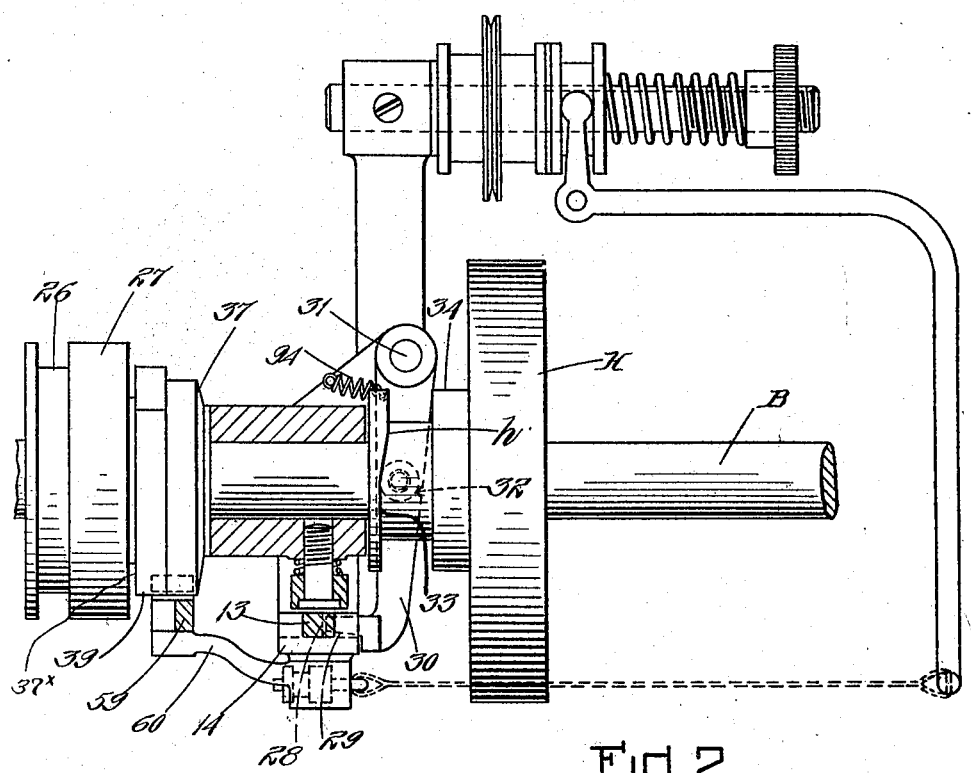
Fig. 2 is a top plan view partly in section of the devices shown in Fig. 1.

When the treadle is released, the spring 93 moves up the treadle bar until the tail of the bell crank 21 contacts with the hooked end of the tail of the latch 52. As the treadle bar moves up, the finger 29 then snaps into the notch 28 in the treadle bar 13 if the movement of the treadle occurs after a predetermined point in the cycle of operation of the machine and the parts are held by the finger 29 from further movement until the high spot h on the cam 34 moves the lever 30 to the right as shown in Fig. 2 and pulls the finger 29 out of the notch 28 in the treadle bar. While the parts are in this position, the operator may depress the treadle again to speed up the machine and can control the speed by the position of the treadle. The finger 29 does not interfere with this movement because the upper corner of the notch 28 in the treadle bar is rounded off. When the finger 29 has been moved by the cam face 33 out of the notch 28 in the treadle bar, the spring 93 can raise the treadle bar and the roll 51 being then in contact with the cam surface b on the latch 52, the latch is unhooked from the tail of the bell crank 21 and the spring 85 is thereafter free to move the bell crank. The movement of the bell crank moves the main drive wheel C out of contact with the hand wheel D and then brings the hub 27 in contact with the roll carrier 39 holding these two parts together tightly enough to speed up the roll-carrier relative to the clutch hub 38 and carry the clutch-rolls ahead and into wedging relation with the driving surface 27' and the inclined or eccentric portions 91 of the clutch hub 38. As soon as the roll carrier 39 revolves far enough, the two rollers 90 acting on the inclined surfaces 91 lock the two clutch members 27 and 28 together and the main shaft of the machine is also momentarily driven at the maximum speed.

When the treadle bar 13 is lifted up by the spring 93 and the latch 52 is unlocked from the tail of the bell crank 21, it also releases the stop lever 40 so that the spring 43 pushes the stop lever over to the left as soon as is permitted by the change in position of the inclined surface c on the cam 37. The arm 46 on the stop lever 40 gets in the path of the tooth 48 on the roll carrier 39 and stops the movement of the roll carrier disengaging the rolls from the driving surface 27' and hub so that from then on the machine is not driven but revolves under its own momentum for about a quarter of a turn, i. e., until stopped in the proper position by the action of the brake. When the upper end of the pin 49 has ridden onto the high spot *e* of the cam 37, the arm 54 is under the pawl 63. The machine then rotates until the end of the pin 49 snaps into the notch *f* of the cam 37. This movement sets the brake 36 and stops the machine almost instantly at the desired predetermined point. It also moves the hub 27 out of contact with the roll carrier. The cutaway portions of the clutch hub 38 are of sufficient circumferential extent to allow the machine to run under its own momentum from the time the arm 46 arrests the tooth 48 to disconnect the high speed drive, Fig. 7, until the machine is stopped by application of the brake. It will be understood that the machine may be slowed down by the action of the cam 37 in compressing the spring 44 so that by the time the brake 36 acts, the speed of the machine may have been somewhat reduced and the machine stopped practically instantaneously when the brake is applied. The stop motion spring 44 and the brake-spring 99 may be made of sufficient strength to secure the described action. The speeding up of the machine prior to stopping, insures the storage in the moving parts of the machine of a predetermined momentum sufficient to operate the stop-motion and brake, and bring the parts to rest in the desired predetermined position, regardless of the speed at which the machine happens to be running when the operator wishes to stop it for removal of the work.

When the operator presses down the treadle to start the machine, the following series of movement takes place: The roll 51 on the treadle bar 13 moves the tail 50 of the stop lever 40 down and swings the pin 49 out of the path of the cam 37. This lets the pawl 63 off the arm 54 on the collar 45. The spring 99 is then free to release the brake and re-set the tension release. The downward movement of the roll 51 on the treadle bar 13 allows the latch 52 to swing into the position shown in Fig. 1 with its lower end against the tail 50 on the stop lever. The roll 19 then engages the wearing surface 20 on the bell crank 21 and at the same time, the upper end of the latch 52 hooks onto the said wearing surface 20. The further movement of the treadle downward, pushes the drive wheel C into frictional contact with the hand wheel D, setting the main shaft in motion at a speed determined by the pressure exerted on the treadle.

What I claim is—

1. In a machine of the class described, in combination, a shaft, variable speed drive mechanism therefor, invariable speed drive mechanism, brake mechanism for said shaft and devices constructed and arranged to cause said shaft to be driven momentarily at a predetermined speed by said invariable speed drive mechanism immediately prior to the stopping thereof.

2. In combination, positive drive mechanism, variable speed drive mechanism, brake mechanism, manual controlling mechanism to initiate a movement of the brake, and automatic means operated by said manual controlling mechanism to disconnect the variable speed drive mechanism and connect the positive drive mechanism to drive the machine immediately before the brake mechanism acts.

3. In combination with a machine, friction driving mechanism for driving the machine at variable speeds, positive driving mechanism for driving it at full speed, and automatic stopping mechanism which connects the machine to the positive full speed driving mechanism before it stops the machine.

4. In combination with a machine, variable speed driving mechanism comprising a friction clutch and means under the control of the operator for actuating the clutch, braking means, a separate positive full speed clutch and mechanism which frees the variable speed clutch and causes the positive full speed clutch to engage and drive the machine before the braking means is actuated to stop the machine.

5. In combination, a main shaft, positive drive mechanism, variable drive mechanism, and brake mechanism for the said shaft, manual controlling means to set the brake mechanism, means operated by said manual controlling mechanism to disconnect the variable drive mechanism and connect the positive drive mechanism to drive the machine immediately before the brake mechanism is set, and means to render the manual controlling means inoperative except at a pre-determined point in the rotation of the main shaft.

6. In combination, a main shaft, positive drive mechanism, variable drive mechanism and brake mechanism for the said shaft, manual controlling mechanism, means operated by said manual controlling mechanism to disconnect the variable drive mechanism and connect the positive drive mechanism to drive the machine immediately before the brake is applied, a cam revolving with the main shaft and means operated by the said cam to render the manual controlling means inopertaive except at a pre-determined point in the rotation of the main shaft.

7. In combination, with a machine having a main shaft, positive drive mechanism therefor, a cam revolving with the main shaft, and stop mechanism which acts on the positive drive mechanism to connect said positive drive mechanism and drive the machine at full speed and then stop it, said cam operating to prevent the said mechanism stopping the machine except during a predetermined part of its cycle of operation.

8. In combination with a machine having a shaft to be driven, rotary full speed driving mechanism therefor, a clutch, a cam connected to the machine shaft, a stop lever having thereon a cam follower and means to disconnect the clutch, means for shifting said stop lever into stopping relation with said cam, means to hold the stop lever out of stopping relation with the cam, means under the control of the operator to release the stop lever, a second cam revolving with the machine, and mechanism actuated thereby to prevent the stop lever moving except during a predetermined part of the rotation of the driving mechanism.

9. In combination with a machine having a shaft to be driven, rotary driving mechanism therefor, a clutch, a cam connected to the machine shaft, a stop lever having thereon a cam follower and means to disconnect the clutch, a latch to hold the stop lever out of contact with the cam, means tending to move the stop lever toward the cam, and means under the control of the operator to release the latch.

10. In combination with a machine having a shaft to be driven, rotary driving mechanism therefor, a clutch, a cam connected to the machine shaft, a stop lever having thereon means to disconnect the clutch, a pin in the stop lever movable by the stop lever into and out of contact with the cam, said pin being reciprocated by the cam when in contact therewith, a brake, and connections between the pin and the brake.

11. In combination with a machine, a rotary driving mechanism therefor, a variable speed friction clutch including a slidable clutch member, a positive acting full speed clutch which is caused to engage by the movement of the slidable clutch member of the variable speed clutch, and mechanism which slides the variable speed clutch member to disconnect the variable speed clutch and by its further movement causes the full speed clutch to engage, and which then disengages the full speed clutch and stops the machine.

12. In combination with a machine having a shaft to be driven, a rotary driving mechanism therefor, a variable speed friction clutch including a slidable clutch member, a positive acting full speed clutch including a clutch hub fixed to the machine shaft, rolls, and a roll carrier having a tooth thereon, a stop lever, connections therewith which slides the variable speed clutch member to disconnect the variable speed clutch and by further movement causes the roll carrier and rolls to connect the clutch member with the clutch hub, said stop lever having a portion which then moves into the path of the tooth on the roll carrier and disconnects the clutch member from the clutch hub to stop the machine.

13. In combination with a machine having a shaft to be driven, rotary driving mechanism therefor, a variable speed clutch, including a slidable clutch member, a positive acting full speed clutch including a clutch hub fixed to the machine shaft, rolls and a roll carrier having a tooth thereon, a clutch fork to slide the variable speed clutch member, a stop lever, a brake, connections from the stop lever to the brake, and to the clutch fork, an arm forming part of said connections and engaging the clutch fork, said stop lever having a portion which comes into the path of the tooth on the roll carrier to disconnect the full speed clutch, the movement of said parts being timed so that the arm then engages the clutch fork and causes it to move the variable speed clutch member into neutral position.

14. In a machine of the character described, a cam, a stop lever, a brake, a spring pin forming a cam follower and carried by said stop lever, a spring for said pin, connections from the spring pin to the brake, and means under the control of the operator to move the stop lever to bring the spring pin into the path of the cam whereby the cam will first compress the spring and then release it to actuate the brake.

15. In a machine of the character described, a cam, a stop lever, a brake, a spring pin forming a cam follower and carried by said stop lever, a spring for said pin, a connection from the spring pin to the brake, said connection including a pawl, and means under the control of the operator to move the stop lever to bring the spring pin into the path of the cam whereby the cam will first compress the spring and set the pawl and will then release the pin and the spring acting through the pawl will set the brake.

16. In a machine of the character described, a variable speed clutch, a brake mechanism, a train of mechanism to set the brake mechanism, a movable treadle bar which operates the variable speed clutch by one part of its movement and actuates said train of mechanism by another part of its movement, and a cut-out acting on the treadle bar to limit its range of movement to that part which actuates the variable speed clutch.

17. In a machine of the character described, a variable speed clutch, a brake mechanism, a train of mechanism to set the brake mechanism, a movable treadle bar which operates the variable speed clutch by one part of its movement and actuates said train of mechanism by another part of its movement, said treadle bar having a notch of a length equal to the range of movement which operates the variable speed clutch, and a member movable into or out of the said notch to limit the range of movement of the treadle bar to that necessary to operate the clutch.

In testimony whereof I affix my signature.

FELIX EMILE VALOIS.